United States Patent
Kowalski (10) Patent No.: US 7,924,782 B2
(45) Date of Patent: Apr. 12, 2011

(54) SYSTEMS AND METHODS FOR ASSIGNING REFERENCE SIGNALS USING A GENETIC ALGORITHM

(75) Inventor: John M. Kowalski, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 831 days.

(21) Appl. No.: 11/859,079

(22) Filed: Sep. 21, 2007

(65) Prior Publication Data

US 2008/0267119 A1   Oct. 30, 2008

Related U.S. Application Data

(60) Provisional application No. 60/914,483, filed on Apr. 27, 2007.

(51) Int. Cl.
  H04W 4/00   (2009.01)
  H04B 7/208  (2006.01)
(52) U.S. Cl. .......................... 370/329; 370/334; 370/344
(58) Field of Classification Search .................. 370/329, 370/334, 344
  See application file for complete search history.

(56) References Cited

U.S. PATENT DOCUMENTS

| | | | |
|---|---|---|---|
| 7,117,202 B1 * | 10/2006 | Willoughby | 707/3 |
| 7,561,628 B2 * | 7/2009 | Sung et al. | 375/260 |
| 7,701,919 B2 * | 4/2010 | Ah Lee | 370/344 |
| 2003/0171122 A1 | 9/2003 | Kim et al. | |
| 2006/0009226 A1 | 1/2006 | Vicharelli et al. | |
| 2006/0039451 A1 * | 2/2006 | Zhuang et al. | 375/145 |
| 2006/0154290 A1 | 7/2006 | Magness et al. | |
| 2006/0229852 A1 * | 10/2006 | Grichnik et al. | 703/2 |
| 2006/0230018 A1 * | 10/2006 | Grichnik et al. | 707/2 |
| 2008/0285433 A1 * | 11/2008 | Akita et al. | 370/204 |
| 2009/0182693 A1 * | 7/2009 | Fulton et al. | 706/16 |
| 2009/0186658 A1 * | 7/2009 | Jiang et al. | 455/562.1 |

OTHER PUBLICATIONS

J-S. Kim, S. Park, P. Dowd, N. Nasrabadi, "Channel Assignment in Cellular Radio using Genetic Algorithms," Wireless Personal Communications, V. 3, No. 3, Sep. 1996, pp. 273-286.

* cited by examiner

*Primary Examiner* — Chi H Pham
*Assistant Examiner* — Farah Faroul
(74) *Attorney, Agent, or Firm* — Austin Rapp & Hardman (57) ABSTRACT

A method for assigning reference signal sequences for communication devices using a genetic algorithm is described. Reference signal sequences are assigned to each cell within a plurality of cells. A fitness function for each reference signal sequence is computed. The fitness function describes the effectiveness of the assignment. A first group of cells is selected to exchange their corresponding assignment information with assignment information corresponding to a second group of cells. The reference signal is assigned to a communications device within the area of one of the plurality of cells.

18 Claims, 9 Drawing Sheets

SYSTEMS AND METHODS FOR ASSIGNING REFERENCE SIGNALS USING A GENETIC ALGORITHM

RELATED APPLICATIONS

This application is related to and claims priority from U.S. Patent Application Ser. No. 60/914,483 filed Apr. 27, 2007, for SYSTEMS AND METHODS FOR ASSIGNING REFERENCE SIGNAL SEQUENCES TO MOBILE STATIONS, with inventors John M. Kowalski, which is incorporated herein by reference.

TECHNICAL FIELD

The present invention relates generally to communications and wireless communications related technology. More specifically, the present invention relates to systems and methods that assign reference signals using genetic algorithms.

BACKGROUND

A wireless communication system typically includes a base station in wireless communication with a plurality of user devices (which may also be referred to as mobile stations, subscriber units, access terminals, etc.). The base station transmits data to the user devices over a radio frequency (RF) communication channel. The term "downlink" refers to transmission from a base station to a user device, while the term "uplink" refers to transmission from a user device to a base station.

Orthogonal frequency division multiplexing (OFDM) is a modulation and multiple-access technique whereby the transmission band of a communication channel is divided into a number of equally spaced sub-bands. A sub-carrier carrying a portion of the user information is transmitted in each sub-band, and every sub-carrier is orthogonal with every other sub-carrier. Sub-carriers are sometimes referred to as "tones." OFDM enables the creation of a very flexible system architecture that can be used efficiently for a wide range of services, including voice and data. OFDM is sometimes referred to as discrete multi-tone transmission (DMT).

The $3^{rd}$ Generation Partnership Project (3GPP) is a collaboration of standards organizations throughout the world. The goal of 3GPP is to make a globally applicable third generation (3G) mobile phone system specification within the scope of the IMT-2000 (International Mobile Telecommunications-2000) standard as defined by the International Telecommunication Union. The 3GPP Long Term Evolution ("LTE") Committee is considering OFDM as well as OFDM/OQAM (Orthogonal Frequency Division Multiplexing/Offset Quadrature Amplitude Modulation), as a method for downlink transmission, as well as OFDM transmission on the uplink.

Wireless communications systems (e.g., Time Division Multiple Access (TDMA), Orthogonal Frequency-Division Multiplexing (OFDM)) usually calculate an estimation of a channel impulse response between the antennas of a user device and the antennas of a base station for coherent receiving. Channel estimation may involve transmitting known reference signals that are multiplexed with the data. Reference signals may include a single frequency and are transmitted over the communication systems for supervisory, control, equalization, continuity, synchronization, etc. Wireless communication systems may include one or more base stations that each transmits a reference signal that is assigned to a mobile station. However, the number of mobile stations may be greater than the number of reference signals. As such, benefits may be realized by improved systems and methods for assigning reference signals to mobile stations.

DETAILED DESCRIPTION

A method for assigning reference signal sequences for communication devices using a genetic algorithm is described. Reference signal sequences are assigned to each cell within a plurality of cells. A fitness function for each reference signal sequence is computed. The fitness function describes the effectiveness of the assignment. A first group of cells is selected to exchange their corresponding assignment information with assignment information corresponding to a second group of cells. The reference signal is assigned to a communications device within the area of one of the plurality of cells.

The fitness function may be a minimum maximum sum correlation of all sequences assigned to a given sector of a cell with sequences assigned to sectors of adjacent cells. Each reference signal sequence may be partitioned to each sector within a cell. In one embodiment, each reference signal sequence assignment is ranked based on the corresponding fitness function. An assignment with a lower fitness function may be ranked higher than an assignment with a higher fitness function.

In one embodiment, the first group of cells is selected based on the ranking of the first group of cells. The assignment information corresponding to the first group of cells may include a basic core assignment of reference signal sequences. The assignment information corresponding to the second group of cells may include a reference signal sequence re-use pattern.

In one embodiment, a third group of cells is selected to create a new generation. Mutations may be inserted into the third group of cells. The mutations may be random reference signal sequence assignments to the cells within the third group of cells following a pre-defined reference signal sequence re-use pattern. In one embodiment, the method is implemented by a base station.

A base station that is configured to assign reference signal sequences for communication devices using a genetic algorithm is described. The base station includes a processor and memory in electronic communication with the processor. Instructions are stored in the memory. Reference signal sequences are assigned to each cell within a plurality of cells. A fitness function for each reference signal sequence is computed. The fitness function describes the effectiveness of the assignment. A first group of cells is selected to exchange their corresponding assignment information with assignment information corresponding to a second group of cells. The reference signal is assigned to a communications device within the area of one of the plurality of cells.

A computer-readable medium comprising executable instructions is also described. Reference signal sequences are assigned to each cell within a plurality of cells. A fitness function for each reference signal sequence is computed. The fitness function describes the effectiveness of the assignment. A first group of cells is selected to exchange their corresponding assignment information with assignment information corresponding to a second group of cells. The reference signal is assigned to a communications device within the area of one of the plurality of cells.

Several exemplary embodiments are now described with reference to the Figures. This detailed description of several exemplary embodiments, as illustrated in the Figures, is not intended to limit the scope of the claims.

The word "exemplary" is used exclusively herein to mean "serving as an example, instance or illustration." Any embodiment described as "exemplary" is not necessarily to be construed as preferred or advantageous over other embodiments.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments," unless expressly specified otherwise.

The term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the 3GPP Long Term Evolution (LTE) standard, reference signals are assigned to User Equipment (UE) (also referred to as mobile terminals) so that the UEs may perform accurate channel estimation. However, not all of the reference signals assigned to the UEs have a low cross-correlation. This may be the result of the dimensionality of the reference signals being much smaller than the number of UEs in use in any area at any one time. The lack of a low cross-correlation between reference signals brings forth the need for a method to re-use the reference signals.

Current methods of reference signal re-use have not been approached within the 3GPP LTE standards. Instead, some forms of sequence hopping have been considered. Current systems may provide N sequences that are divided up amongst L cells. There may also be K sectors per cell. Further, in any sector there may be M sequences to be assigned per sector.

Typically, for 3GPP LTE, the reference signal sequences may be grouped together in blocks of K*M sequences which have low cross-correlation amongst themselves. However, these blocks of sequences may have larger cross-correlation outside of those blocks of sequences. Furthermore, typically it is assumed that each block of sequences are assigned to any one cell. The present systems and methods minimize the average (non-coherently measured) cross-correlation between adjacent sectors of cells. The problem of sequence assignment may be a type of integer programming problem that includes a large number of possible solutions. In one embodiment, a genetic algorithm is implemented to assign reference signal sequences to mobile terminals.

Figure 1:
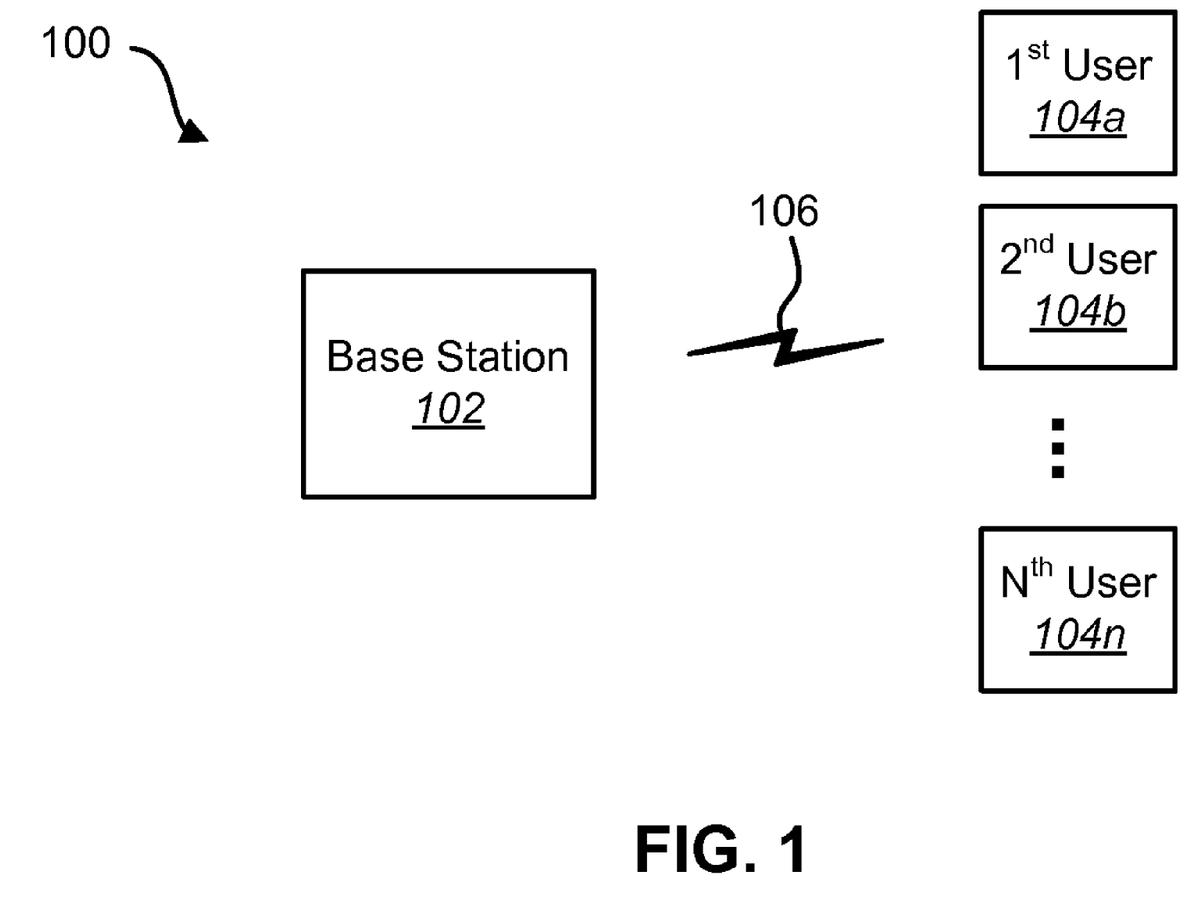
FIG. 1 illustrates an exemplary wireless communication system in which embodiments may be practiced.

FIG. 1 illustrates an exemplary wireless communication system 100 in which embodiments of the present systems and methods may be practiced. A base station 102 is in wireless communication with a plurality of user devices 104 (which may also be referred to as mobile stations, subscriber units, access terminals, etc.). A first user device 104a, a second user device 104b, and an Nth user device 104n are shown in FIG. 1. The base station 102 transmits data to the user devices 104 over a radio frequency (RF) communication channel 106.

As used herein, the term "OFDM transmitter" refers to any component or device that transmits OFDM signals. An OFDM transmitter may be implemented in a base station 102 that transmits OFDM signals to one or more user devices 104. Alternatively, an OFDM transmitter may be implemented in a user device 104 that transmits OFDM signals to one or more base stations 102.

The term "OFDM receiver" refers to any component or device that receives OFDM signals. An OFDM receiver may be implemented in a user device 104 that receives OFDM signals from one or more base stations 102. Alternatively, an OFDM receiver may be implemented in a base station 102 that receives OFDM signals from one or more user devices 104.

Figure 2:
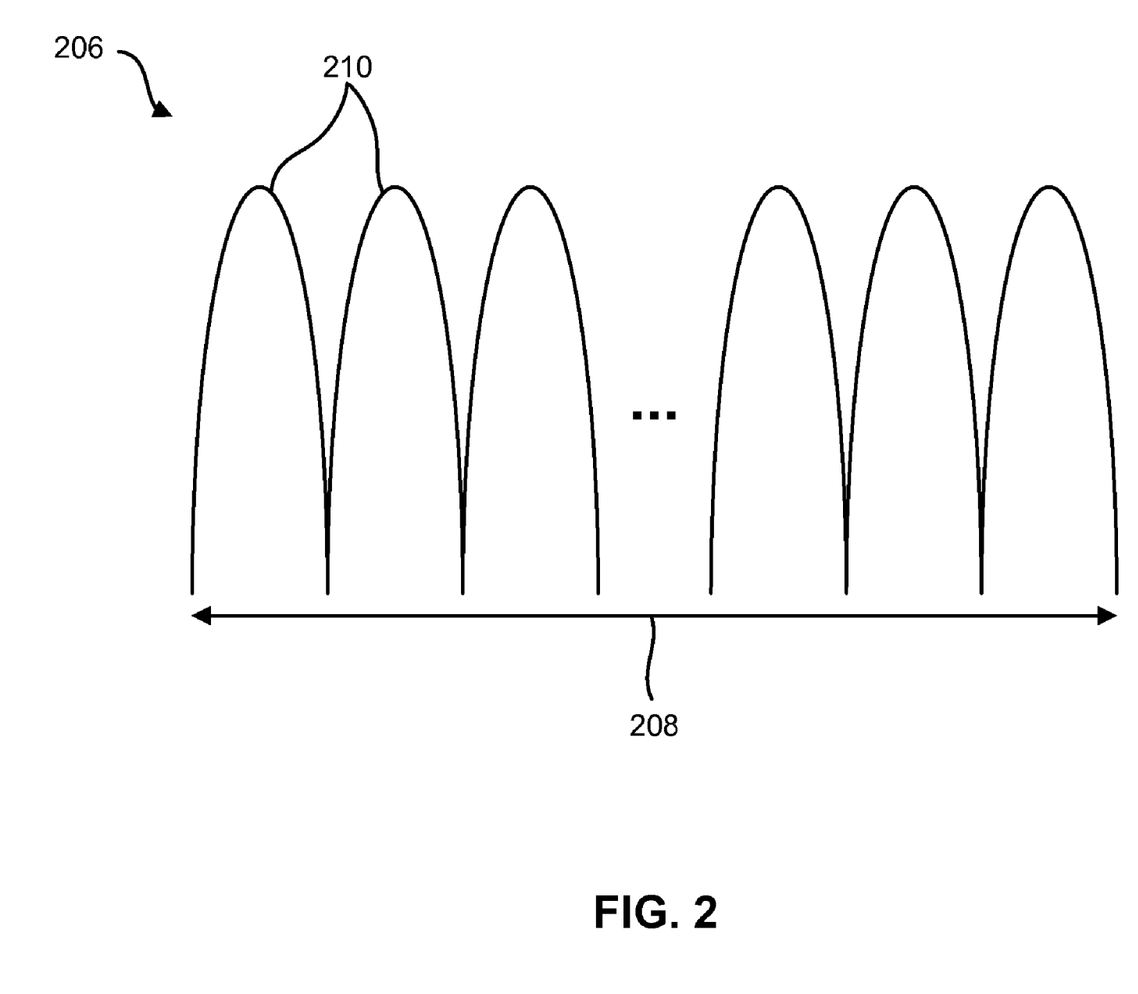
FIG. 2 illustrates some characteristics of a transmission band of an RF communication channel in accordance with an OFDM-based system.

FIG. 2 illustrates some characteristics of a transmission band 208 of an RF communication channel 206 in accordance with an OFDM-based system. As shown, the transmission band 208 may be divided into a number of equally spaced sub-bands 210. As mentioned above, a sub-carrier carrying a portion of the user information is transmitted in each sub-band 210, and every sub-carrier is orthogonal with every other sub-carrier.

Figure 3:
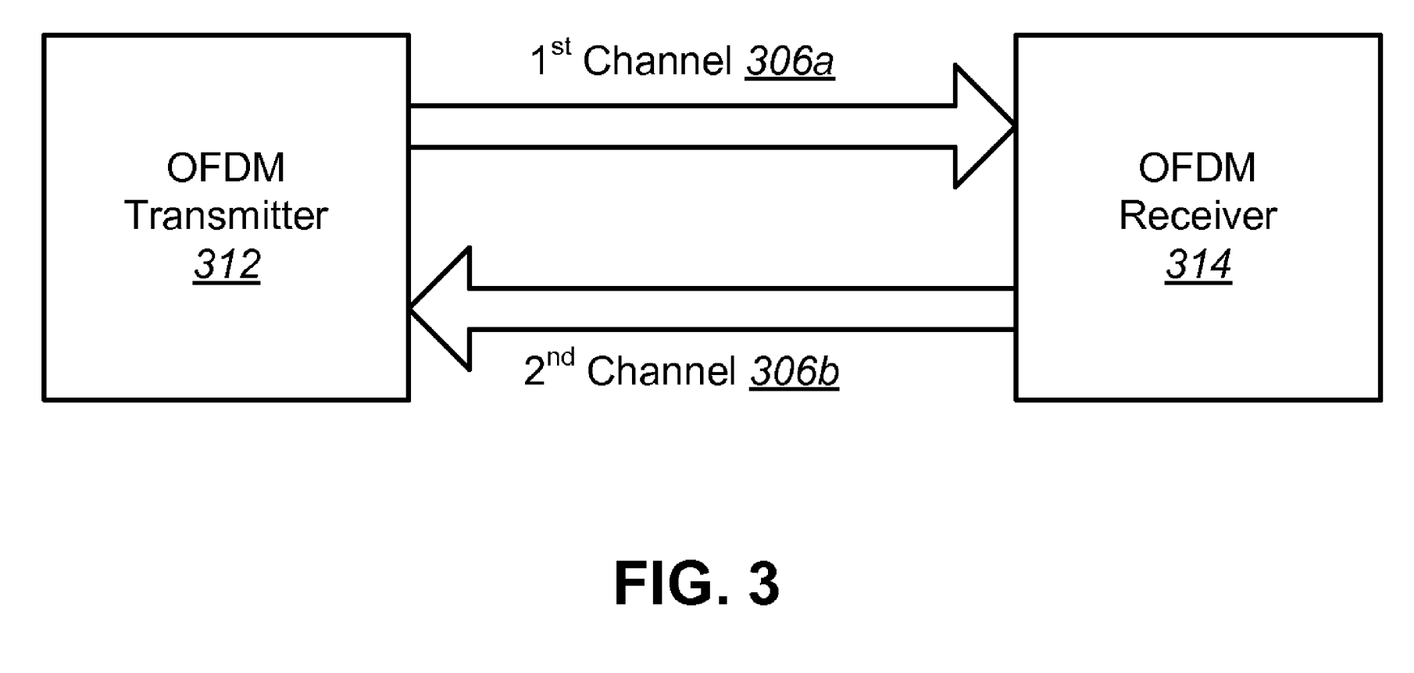
FIG. 3 illustrates communication channels that may exist between an OFDM transmitter and an OFDM receiver according to an embodiment.

FIG. 3 illustrates communication channels 306 that may exist between an OFDM transmitter 312 and an OFDM receiver 314 according to an embodiment. As shown, communication from the OFDM transmitter 312 to the OFDM receiver 314 may occur over a first communication channel 306a. Communication from the OFDM receiver 314 to the OFDM transmitter 312 may occur over a second communication channel 306b.

The first communication channel 306a and the second communication channel 306b may be separate communication channels 306. For example, there may be no overlap between the transmission band of the first communication channel 306a and the transmission band of the second communication channel 306b.

In addition, the present systems and methods may be implemented with any modulation that utilizes multiple antennas/MIMO transmissions. For example, the present systems and methods may be implemented for MIMO Code Division Multiple Access (CDMA) systems or Time Division Multiple Access (TDMA) systems.

Figure 4:
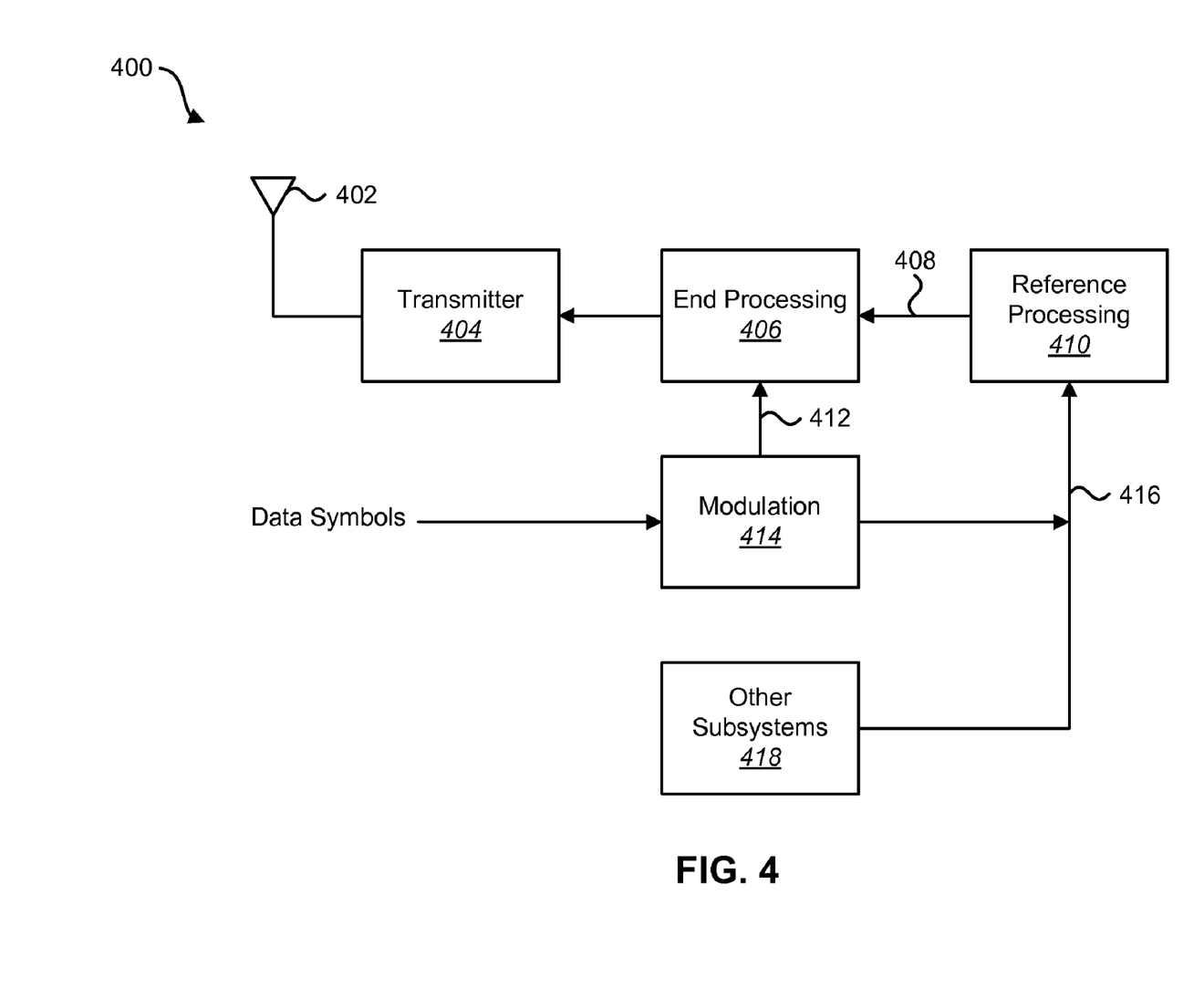
FIG. 4 illustrates a block diagram of certain components implemented in conjunction with a transmitter.

FIG. 4 illustrates a block diagram 400 of certain components implemented in conjunction with a transmitter 404. Other components that are typically included with the transmitter 404 may not be illustrated for the purpose of focusing on the novel features of the embodiments herein.

Data symbols may be modulated by a modulation component 414. The modulated data symbols may be analyzed by other subsystems 418. The analyzed data symbols 416 may be provided to a reference processing component 410. The reference processing component 410 may generate a reference signal that may be transmitted with the data symbols. The modulated data symbols 412 and the reference signal 408 may be communicated to an end processing component 406. The end processing component 406 may combine the reference signal 408 and the modulated data symbols 412 into a signal. The transmitter 404 may receive the signal and transmit the signal to a receiver through an antenna 402. In one embodiment, the reference signal is assigned to a mobile terminal to enable the mobile terminal to perform channel estimation.

Figure 5:
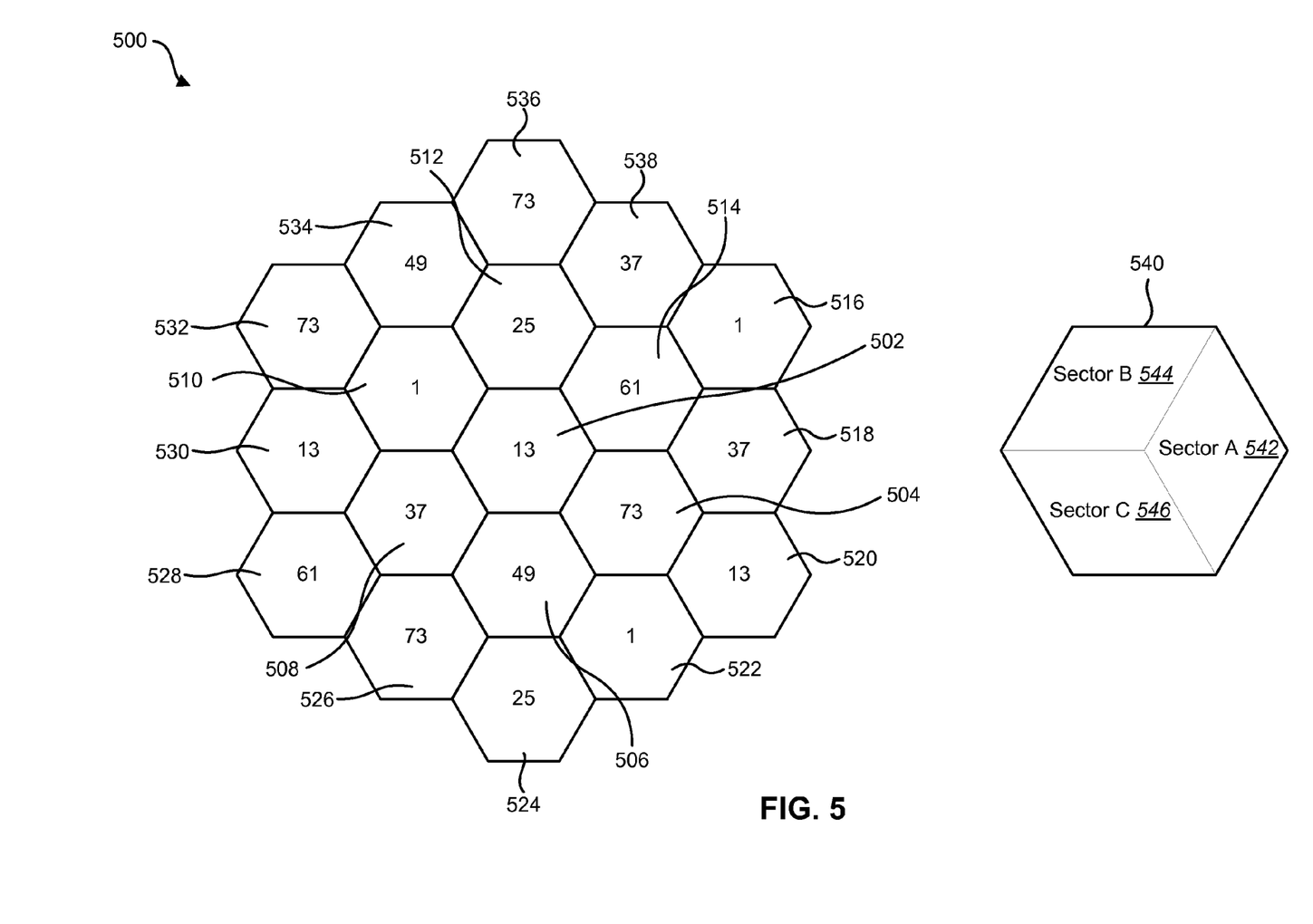
FIG. 5 is a diagram illustrating one embodiment of a plurality of cells that include a sequence assignment pattern and a sequence re-use pattern.

FIG. 5 is a diagram 500 illustrating one embodiment of a plurality of cells 502-538 that illustrates a sequence assignment pattern and a sequence re-use pattern. An example cell 540 is provided for simplicity. The example cell 540 includes three sectors; sector A 542, sector B 544 and sector C 546. Each cell within the plurality of cells 502-538 may include three sectors in a manner similar to the three sectors included in the example cell 540.

In one embodiment, 84 sequences may be assigned to the plurality of cells 502-538. As illustrated, the plurality of cells 502-538 includes 19 cells. Each of the 19 cells includes three sectors arranged in a manner similar to the sectors of the example cell 540. Each cell includes a number that represents the first sequence out of 12 sequences assigned to a given cell. For example, an inner cell 502 includes the number "13." In other words, the inner cell 502 is assigned sequences 13-24. As another example, a first outer cell 518 includes the number "37" and a second outer cell 536 includes the number "73." In one embodiment, the first outer cell 518 is assigned sequences 37-48 and the second outer cell 536 is assigned the sequences 73-84.

The diagram 500 also illustrates one embodiment of a reference signal re-use pattern. As stated above, the inner cell 502 is assigned sequences 13-24. In addition, a third outer cell 520 is also assigned sequences 13-24. In other words, the sequences 13-24 are re-used from the inner cell 502 to the third outer cell 520.

Figure 6:
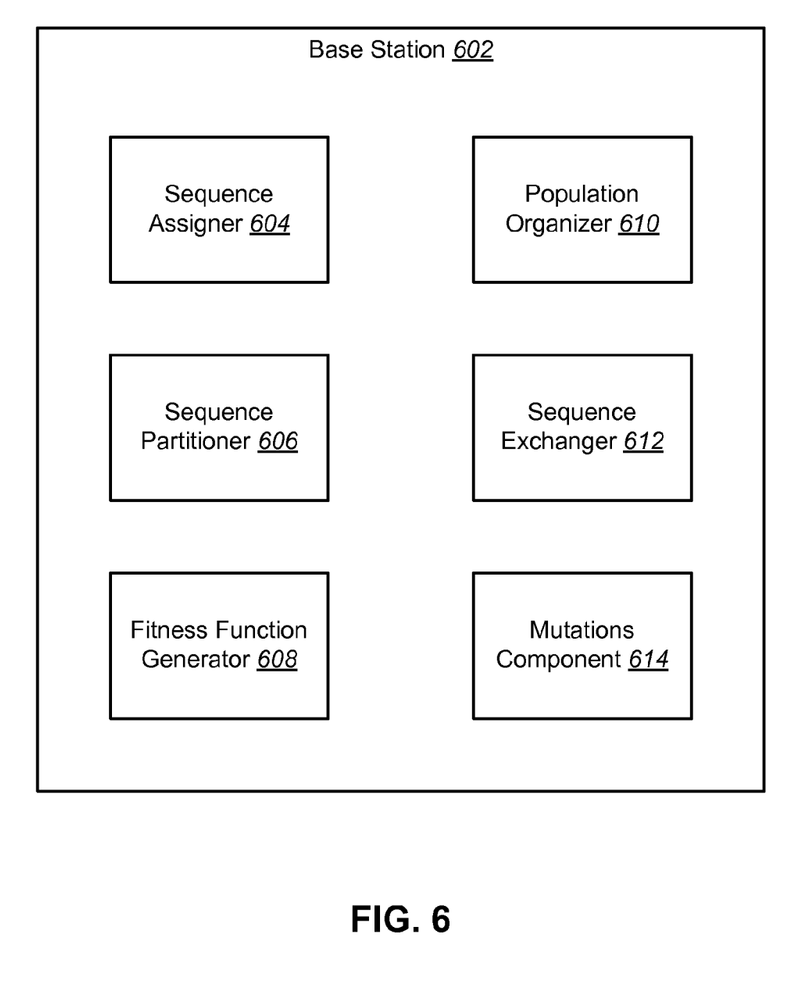
FIG. 6 is a block diagram illustrating one embodiment of a base station that may assign reference signal sequences to mobile terminals.

FIG. 6 is a block diagram illustrating one embodiment of a base station 602 that may assign reference signal sequences to mobile terminals. The base station 602 may also be referred to as a NodeB, an Evolved NodeB (eNB), etc. In one embodiment, the base station 602 implements a genetic algorithm to obtain a plurality of possible solutions relating to the assignment of sequences. The base station 602 may execute one or more iterations of the algorithm. As a result, the iterations cause the plurality of possible solutions to converge to an optimum solution.

In a genetic algorithm, a population P of possible solutions to an optimization problem evolves toward more optimum solutions. The possible solutions that are included in the population may be referred to as members of the population. A fitness function f is defined for each member of the population. The fitness function f may describe the effectiveness of a member in achieving a particular objective. The algorithm may include a reproduction strategy in which features of certain members of the population are exchanged with features of other members of the population to create a subset of a new generation of the population. The fitness function may be used to determine which members exchange features. Further, random mutations may be introduced into the new generation of the population. The new generation of the population may be used in the next iteration of the genetic algorithm.

A sequence assigner 604 may randomly assign blocks of sequences to cells. In one embodiment, a sequence partitioner 606 partitions a block of sequences assigned to an individual cell to the sectors of that cell. A fitness function generator 608 may generate a fitness function f for each assignment of the blocks of sequences. The possible assignments of the blocks of sequences may be referred to as a population. The fitness function f may describe how effective a particular solution is. For example, the fitness function f may indicate that a particular assignment is not effective because the cross-correlation between the blocks of sequences with adjacent sectors is high.

Using the fitness functions for the various assignments (solutions) of the blocks of sequences, a population organizer 610 ranks each solution. A sequence exchanger 612 exchanges features of certain solutions with other solutions. In one embodiment, the sequence exchanger 612 determines which solutions should exchange features based on the rankings provided by the population organizer 610. The exchange of features may create a subset of a new generation of the population. A mutations component 614 may introduce random mutations into the new generation. The mutations may be introduced with random assignments of blocks of sequences to cells according to a pre-defined re-use pattern.

Figure 7:
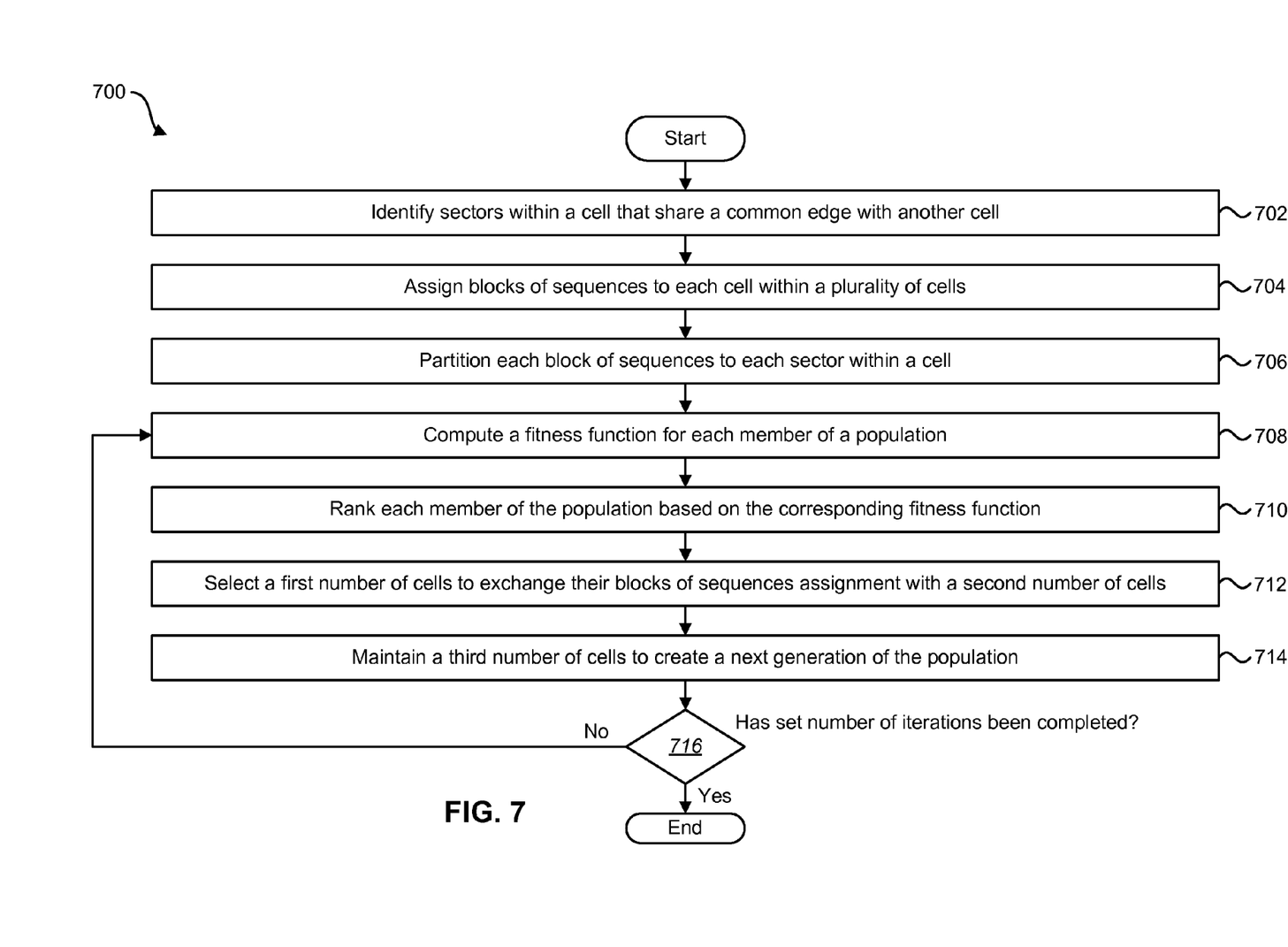
FIG. 7 is a flow diagram illustrating one embodiment of a method for assigning reference signal sequences using a genetic algorithm.

FIG. 7 is a flow diagram illustrating one embodiment of a method 700 for assigning reference signal sequences using a genetic algorithm. The method 700 may be implemented by the base station 602. A population representing possible assignments of sequences to cells may be provided. For example, a population with approximately 500 members (i.e. solutions) may be provided. Each member of the population may represent an assignment of sequences to one of 19 cells (as illustrated in FIG. 5). In one embodiment, sectors within a cell are identified 702 that share a common edge with another cell. The cell/sector geometry may be similar to the cell/sector geometry illustrated in FIG. 5. However, other cell/sector geometries may also implement the method 700.

Blocks of sequences may be assigned 704 to each of the 19 cells. In one embodiment, the blocks of sequences are assigned randomly to each of the 19 cells. The random assignment may follow a prescribed re-use pattern. For example, for 84 sequences allocated with four sequences per sector, a re-use pattern as depicted in Table 1 might be used.

TABLE 1

Re-Use Patterns for Base Sequences

| Cell | Re-Use Pattern #1 | Re-Use Pattern #2 |
|------|-------------------|-------------------|
| 1    | 12 and 17         | 11 and 17         |
| 2    | 14                | 13                |
| 3    | 16                | 15                |
| 4    | 8, 15 and 18      | 16 and 19         |
| 5    | 19                | 9 and 18          |
| 6    | 9 and 11          | 8 and 12          |
| 7    | 10 and 13         | 10 and 14         |

Each block of sequences may be further partitioned 706 to each sector within the cells. In one embodiment, a fitness function f is computed 708 for each member of the population. The fitness function f may be the minimum maximum sum correlation of all sequences assigned to a given sector with sequences assigned in adjacent sectors. The fitness function f for a given population may be given by:

$$f(P_k) = \max_{sectors} \Sigma_{all\ adjacent\ sectors} \text{(cross-correlations of all sequences in adjacent sector assignments)}^2$$

where the term "$\Sigma_{all\ adjacent\ sectors}$" denotes the sum over all adjacent sectors to a given sector.

Each member of the population may be ranked 710 based on their corresponding fitness function f. In one embodiment, the members with the highest ranking are those for whom $f(P_k)$ is the smallest. In other words, the members of the population are ranked 710 according to the lowest $f(P_k)$.

A first number of cells may be selected 712 to exchange their blocks of sequences assignment with a second number of cells. The cells may be selected 712 based upon the rankings of the members of the population associated with the cells. In one embodiment, the first number of cells is 25% of the cells. For example, using the cell/sector geometry of FIG. 5, the inner cell 502 and the first outer cells 504-514 are selected to exchange their blocks of sequences assignment with the blocks of sequences assignments of the outer cells 516-538. In one embodiment, the features exchanged include a basic core assignment of blocks of sequences to cells is exchanged with a re-use assignment in adjacent cells.

In one embodiment, this exchange of assignments creates two "children" per parent which may make up 50% of a next generation of the population. In addition, a third number of cells are maintained 714 to create a part of the next generation of the population. In one embodiment, the lowest ranked 25% of cells are maintained 714 for the next generation of the population. Further, another 25% of the population may be randomly chosen to create the next generation. As previously explained, mutations may be introduced with random assignments of blocks of sequences to cells according to a predefined re-use pattern.

A determination 716 may be made whether a set number of iterations have been completed. If not, steps 708-714 may be repeated. The fitness function f may not decrease from iteration to iteration. In an assignment of 108 sequences with four sequences per cell a similar process may be implemented with the core assignment involving the inner cell 502 and the first outer cells 504-514 as well as some of the second outer cells 520-524, 532-536. The re-use pattern may vary amongst the remaining second outer cells 516, 518, 526, 528, 530, 538. In an assignment of 84 sequences with two sequences per cell, the assignment may be done in a similar manner.

In one embodiment, the method 700 may assign 704 sequences of different lengths statically as well. The short sequences may be concatenated into longer sequences. The fitness function f and rankings may be computed in a similar manner as previously explained. Accordingly, the method 700 assigns sequences of shorter lengths and longer lengths to a set of cells/sectors.

Figure 8:
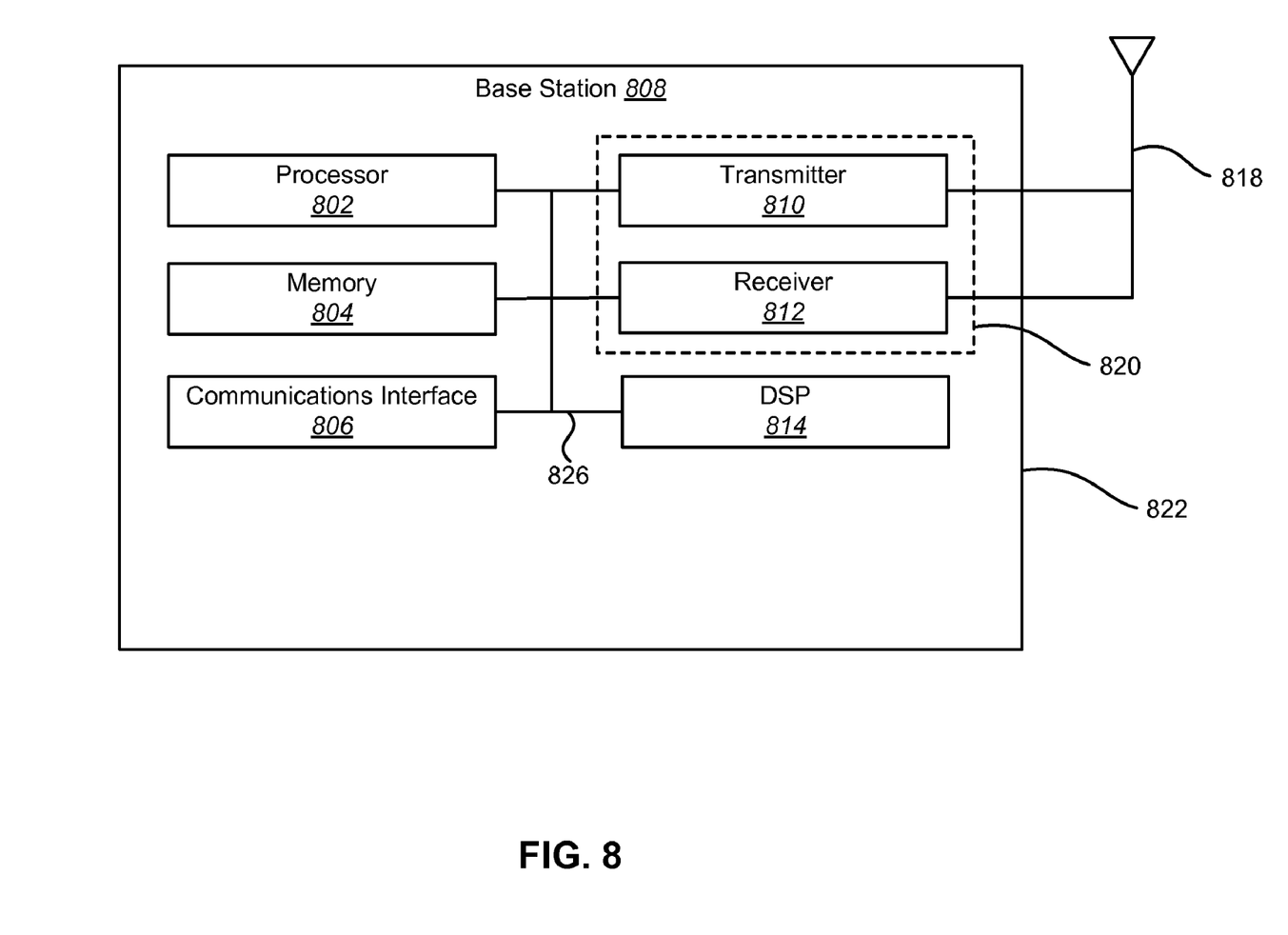
FIG. 8 illustrates various components that may be utilized in a base station.

FIG. 8 is a block diagram of a base station 808 in accordance with one embodiment of the disclosed systems and methods. The base station 808 may be an eNB, a base station controller, a base station transceiver, etc. The base station 808 includes a transceiver 820 that includes a transmitter 810 and a receiver 812. The transceiver 820 may be coupled to an antenna 818. The base station 808 further includes a digital signal processor (DSP) 814, a general purpose processor 802, memory 804, and a communication interface 806. The various components of the base station 808 may be included within a housing 822.

The processor 802 may control operation of the base station 808. The processor 802 may also be referred to as a CPU.

The memory 804, which may include both read-only memory (ROM) and random access memory (RAM), provides instructions and data to the processor 802. A portion of the memory 804 may also include non-volatile random access memory (NVRAM). The memory 804 may include any electronic component capable of storing electronic information, and may be embodied as ROM, RAM, magnetic disk storage media, optical storage media, flash memory, on-board memory included with the processor 802, EPROM memory, EEPROM memory, registers, a hard disk, a removable disk, a CD-ROM, etc. The memory 804 may store program instructions and other types of data. The program instructions may be executed by the processor 802 to implement some or all of the methods disclosed herein.

Figure 9:
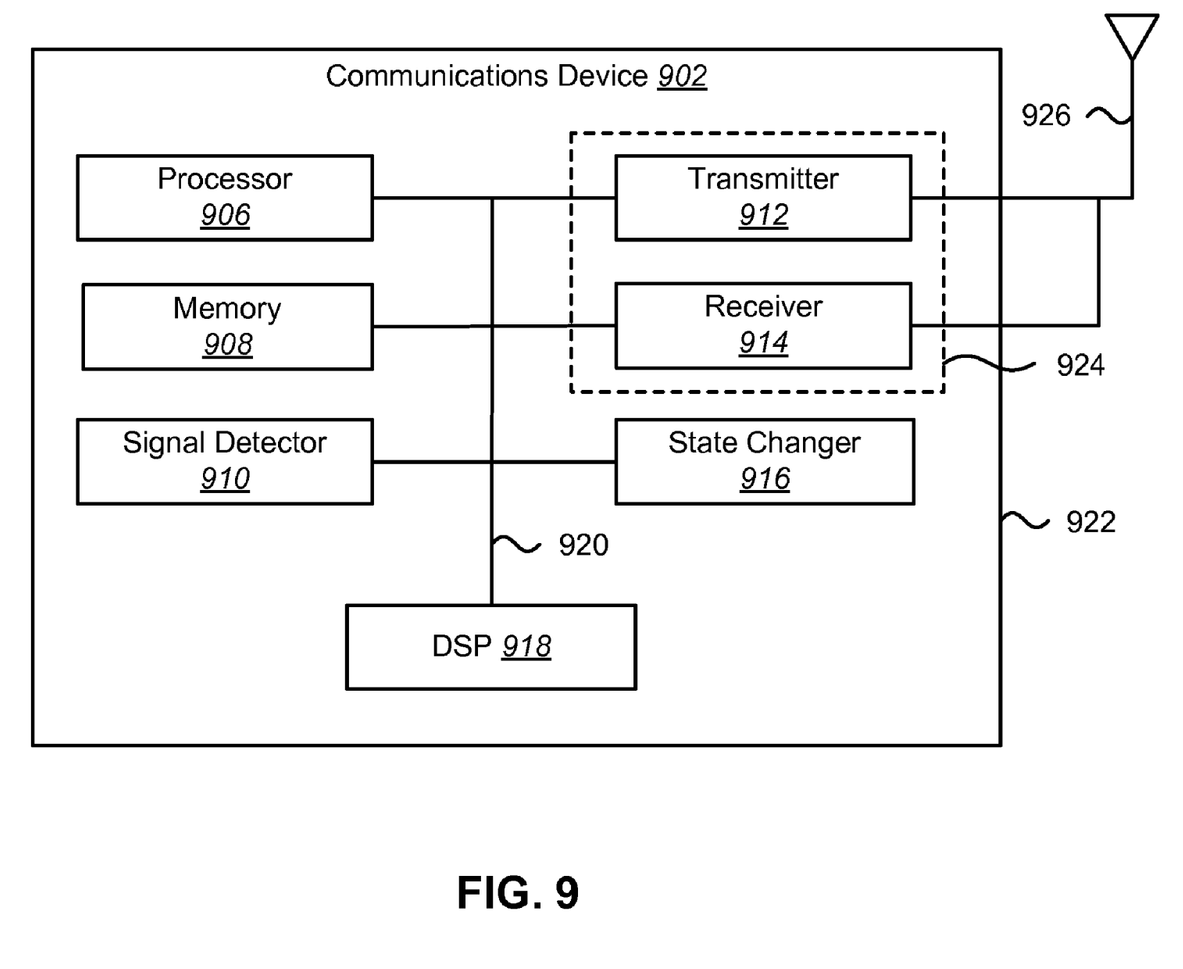
FIG. 9 illustrates various components that may be utilized in a communications device.

In accordance with the disclosed systems and methods, the antenna 818 may receive reverse link signals that have been transmitted from a nearby communications device 902, such as a mobile terminal illustrated in FIG. 9. The antenna 818 provides these received signals to the transceiver 820 which filters and amplifies the signals. The signals are provided from the transceiver 820 to the DSP 814 and to the general purpose processor 802 for demodulation, decoding, further filtering, etc.

The various components of the base station 808 are coupled together by a bus system 826 which may include a power bus, a control signal bus, and a status signal bus in addition to a data bus. However, for the sake of clarity, the various busses are illustrated in FIG. 8 as the bus system 826.

FIG. 9 illustrates various components that may be utilized in a communications device 902 such as a mobile terminal, in accordance with one embodiment. The device 902 includes a processor 906 which controls operation of the device 902. The processor 906 may also be referred to as a CPU.

Memory 908, which may include both read-only memory (ROM) and random access memory (RAM), provides instructions and data to the processor 906. A portion of the memory 908 may also include non-volatile random access memory (NVRAM). The memory 908 may include any electronic component capable of storing electronic information, and may be embodied as ROM, RAM, magnetic disk storage media, optical storage media, flash memory, on-board memory included with the processor 906, EPROM memory, EEPROM memory, registers, a hard disk, a removable disk, a CD-ROM, etc. The memory 908 may store program instructions and other types of data. The program instructions may be executed by the processor 906 to implement some or all of the methods disclosed herein.

The device 902 may also include a housing 922 that includes a transmitter 912 and a receiver 914 to allow transmission and reception of data between the communications device 902 and a remote location. The transmitter 912 and receiver 914 may be combined into a transceiver 924. An antenna 926 is attached to the housing 922 and electrically coupled to the transceiver 924.

The communications device 902 also includes a signal detector 910 used to detect and quantify the level of signals received by the transceiver 924. The signal detector 910 detects such signals as total energy, power spectral density and other signals.

A state changer 916 of the device 902 controls the state of the device 902 based on a current state and additional signals received by the transceiver 924 and detected by the signal detector 910. The device 902 is capable of operating in any one of a number of states.

The various components of the device 902 are coupled together by a bus system 920 which may include a power bus, a control signal bus, and a status signal bus in addition to a data bus. However, for the sake of clarity, the various busses are illustrated in FIG. 9 as the bus system 920. The device 902 may also include a digital signal processor (DSP) 918 for use in processing signals.

FIG. 9 illustrates only one possible configuration of a communications device 902. Various other architectures and components may be utilized.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the embodiments disclosed herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

While specific embodiments have been illustrated and described, it is to be understood that the claims are not limited to the precise configuration and components illustrated above. Various modifications, changes and variations may be made in the arrangement, operation and details of the embodiments described above without departing from the scope of the claims.

What is claimed is:

1. A method for assigning reference signal sequences for communication devices using a genetic algorithm, comprising:
assigning reference signal sequences to each cell within a plurality of cells;
computing a fitness function for each reference signal sequence, wherein the fitness function describes the effectiveness of the assignment;
ranking each reference signal sequence assignment based on the corresponding fitness function, wherein an assignment with a lower fitness function is ranked higher than an assignment with a higher fitness function;
selecting a first group of cells to exchange their corresponding assignment information with assignment information corresponding to a second group of cells; and
assigning each reference signal sequence to a communications device within the area of one of the plurality of cells.

2. The method of claim 1, wherein the fitness function is a minimum maximum sum correlation of all sequences assigned to a given sector of a cell with sequences assigned to sectors of adjacent cells.

3. The method of claim 1, further comprising partitioning each reference signal sequence to each sector within a cell.

4. The method of claim 1, further comprising selecting the first group of cells based on the ranking of the first group of cells.

5. The method of claim 1, wherein the assignment information corresponding to the first group of cells comprises a basic core assignment of reference signal sequences.

6. The method of claim 1, wherein the assignment information corresponding to the second group of cells comprises a reference signal sequence re-use pattern.

7. The method of claim 1, further comprising selecting a third group of cells to create a new generation.

8. The method of claim 1, further comprising inserting mutations into the third group of cells, wherein the mutations are random reference signal sequence assignments to the cells within the third group of cells following a pre-defined reference signal sequence re-use pattern.

9. The method of claim 1, wherein the method is implemented by a base station.

10. A base station that is configured to assign reference signal sequences for communication devices using a genetic algorithm, the base station comprising:
a processor;
memory in electronic communication with the processor;
instructions stored in the memory, the instructions being executable to:
assign reference signal sequences to each cell within a plurality of cells;
compute a fitness function for each reference signal sequence, wherein the fitness function describes the effectiveness of the assignment;

rank each reference signal sequence assignment based on the corresponding fitness function, wherein an assignment with a lower fitness function is ranked higher than an assignment with a higher fitness function;

select a first group of cells to exchange their corresponding assignment information with assignment information corresponding to a second group of cells; and assign each reference signal sequence to a communications device within the area of one of the plurality of cells.

11. The base station of claim 10, wherein the fitness function is a minimum maximum sum correlation of all sequences assigned to a given sector of a cell with sequences assigned to sectors of adjacent cells.

12. The base station of claim 10, wherein the instructions are further executable to partition each reference signal sequence to each sector within a cell.

13. The base station of claim 10, wherein the instructions are further executable to select the first group of cells based on the ranking of the first group of cells.

14. The base station of claim 10, wherein the assignment information corresponding to the first group of cells comprises a basic core assignment of reference signal sequences.

15. The base station of claim 10, wherein the assignment information corresponding to the second group of cells comprises a reference signal sequence re-use pattern.

16. The base station of claim 10, wherein the instructions are further executable to select a third group of cells to create a new generation.

17. The base station of claim 10, wherein the instructions are further executable to insert mutations into the third group of cells, wherein the mutations are random reference signal sequence assignments to the cells within the third group of cells following a pre-defined reference signal sequence re-use pattern.

18. A non-transitory computer-readable medium comprising executable instructions for:

assigning reference signal sequences to each cell within a plurality of cells;

computing a fitness function for each reference signal sequence, wherein the fitness function describes the effectiveness of the assignment;

ranking each reference signal sequence assignment based on the corresponding fitness function, wherein an assignment with a lower fitness function is ranked higher than an assignment with a higher fitness function;

selecting a first group of cells to exchange their corresponding assignment information with assignment information corresponding to a second group of cells; and assigning each reference signal sequence to a communications device within the area of one of the communication cells.

* * * * *